「(12) United States Patent
Kvetny et al.

(10) Patent No.: US 10,349,354 B2
(45) Date of Patent: Jul. 9, 2019

(54) BLUETOOTH LOW ENERGY DEVICES, SYSTEMS, AND ASSOCIATED METHODS

(71) Applicant: Intel IP Corporation, Santa Clara, CA (US)

(72) Inventors: Eduard Kvetny, Rishon-Lezion (IL); Olga Adamovsky, Mevaseret Zion (IL); Remi Laudebat, Sophia Antipolis (FR); Brian Leete, Beaverton, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/647,159

(22) Filed: Jul. 11, 2017

(65) Prior Publication Data

US 2018/0132180 A1    May 10, 2018

Related U.S. Application Data

(63) Continuation of application No. 14/752,573, filed on Jun. 26, 2015, now Pat. No. 9,706,493.

(51) Int. Cl.
H04W 52/02    (2009.01)
H04W 4/80    (2018.01)
H04L 29/08    (2006.01)
H04W 68/00    (2009.01)

(52) U.S. Cl.
CPC ......... H04W 52/0229 (2013.01); H04L 67/28 (2013.01); H04W 4/80 (2018.02); H04W 68/005 (2013.01); Y02D 70/00 (2018.01); Y02D 70/144 (2018.01); Y02D 70/26 (2018.01)

(58) Field of Classification Search
CPC ............ H04W 52/0229; H04W 4/008; H04W 68/005
See application file for complete search history.

(56) References Cited

U.S. PATENT DOCUMENTS 9,706,493 B2 *  7/2017  Kvetny ................. H04L 67/28
2013/0090061 A1  4/2013  Linde
2014/0187889 A1  7/2014  Cohen et al.
2015/0099467 A1 *  4/2015  Kang ............... H04W 52/0229
                                                  455/41.2
2015/0103708 A1 *  4/2015  Kang ............... H04W 72/0433
                                                  370/329

(Continued)

FOREIGN PATENT DOCUMENTS

EP        2400714        12/2011
WO    WO 2012/001462     1/2012

OTHER PUBLICATIONS

"Bluetooth Specification v4.2"; www.bluetooth.org/DocMan/handlers/DownloadDoc.ashx?doc; Dated Oct. 2, 2014.

*Primary Examiner* — Albert T Chou
(74) *Attorney, Agent, or Firm* — Thorpe North and Western, LLP; David W. Osborne

(57) ABSTRACT

An apparatus of a Bluetooth low energy (BLE) device is provided for decreasing awake time of a host by receiving and processing peripheral data along a sideband channel and waking the host upon an event of interest, the apparatus comprising circuitry configured to receive BLE GATT data from a BLE core along a sideband channel, process the BLE GATT data, monitor processed BLE GATT data for an event of interest, and send a notification of a detection of the event of interest to the host.

22 Claims, 4 Drawing Sheets

(56) References Cited

U.S. PATENT DOCUMENTS

| | | | |
|---|---|---|---|
| 2015/0289081 A1* | 10/2015 | Chen | H04W 8/005 455/41.2 |
| 2016/0007289 A1* | 1/2016 | Weizman | H04W 52/0229 370/311 |
| 2016/0080896 A1* | 3/2016 | Song | H04L 65/602 455/41.2 |
| 2016/0095060 A1* | 3/2016 | Seddighrad | H04W 52/0225 370/311 |
| 2016/0249292 A1* | 8/2016 | Viswanadham | H04L 12/1886 |

* cited by examiner

BLUETOOTH LOW ENERGY DEVICES, SYSTEMS, AND ASSOCIATED METHODS

PRIORITY DATA

This application is a Continuation of U.S. patent application Ser. No. 14/752,573, filed Jun. 26, 2015, now issued as U.S. Pat. No. 9,706,493, which is incorporated herein by reference.

BACKGROUND

Bluetooth is a wireless technology standard managed by the Bluetooth Special Interest Group (SIG) for exchanging data over short distances between Bluetooth-compatible devices, including fixed and mobile devices. Bluetooth low energy (BLE) is an implementation of the Bluetooth standard that was first adopted in the Bluetooth Core Specification 4.0. BLE provides wireless data transmission with reduced power consumption at similar ranges as standard Bluetooth, and has standardized support for several specific applications in the healthcare, fitness, beacon, security, and home entertainment industries.

DESCRIPTION OF EMBODIMENTS

Figure 1:
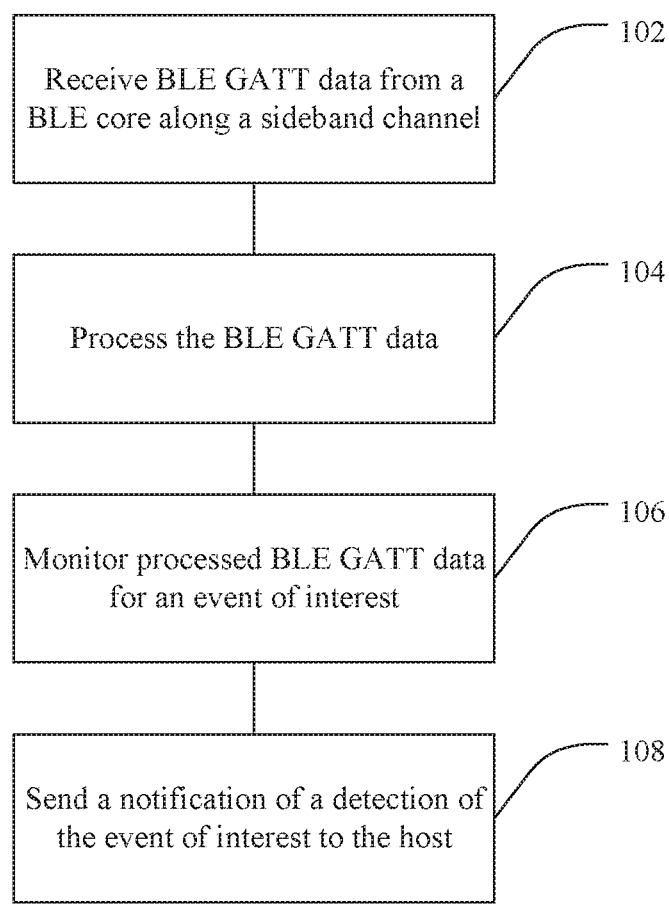
FIG. 1 is a depiction of circuitry operations of an apparatus of a BLE device in accordance with an invention embodiment.

Although the following detailed description contains many specifics for the purpose of illustration, a person of ordinary skill in the art will appreciate that many variations and alterations to the following details can be made and are considered to be included herein.

Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this specification, like "comprising" or "including," it is understood that direct support should be afforded also to "consisting essentially of" language as well as "consisting of" language as if stated explicitly and vice versa.

"The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects or structures described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

Reference throughout this specification to "an example" or use of the term "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, "enhanced," "improved," "performance-enhanced," "upgraded," and the like, when used in connection with the description of a device or process, refers to a characteristic of the device or process that provides measurably better form or function as compared to previously known devices or processes. This applies both to the form and function of individual components in a device or process, as well as to such devices or processes as a whole.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.2, 3, 3.6, 4, 4.7, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

EXAMPLE EMBODIMENTS

An initial overview of technology embodiments is provided below and specific technology embodiments are then described in further detail. This initial summary is intended to aid readers in understanding the technology more quickly but is not intended to identify key or essential technological features, nor is it intended to limit the scope of the claimed subject matter.

Wearables, remote bio-sensors, and other remote devices have become increasingly common accoutrements associated with various host devices, including mobile devices, such as smart phones, tablets, laptops, automobiles, and the like, as well as with non-mobile or semi-mobile devices such as desktop computers or other stationary electronics. In some cases the processing of data from a remote device can be intermittent or sporadic. Many applications are of a nature that data from a remote device is only infrequently or intermittently acquired. Non-limiting examples may include applications utilizing devices that report sports scores, stock prices, temperature readings, and the like. In other cases, a given application may benefit from more prolonged data computation, or even continuous data computation for long periods of time. Non-limiting examples can include applications associated with various health monitoring devices such as heart or EKG monitors, neural or EEG monitors, motion sensors, and the like. The required frequency of operation may not be absolutely dictated by a given host, remote device, or application, however, but rather can be a result of the particular circumstances under which the devices and application are operated. User or designer preferences can also influence the duty cycle of computation to awaken operations from sleep states. A stock broker, for example, may desire more frequent or even continuous stock price updates as compared to a typical user. Regardless of the degree or frequency of data computation, Bluetooth Low Energy (BLE) can be a useful technology for wirelessly connecting such devices together, particularly for situations where low power consumption is a consideration.

The BLE protocol stack (or BLE stack) has three primary building blocks or primary layers, namely the application, the host, and the controller. The application is at the highest layers of the BLE stack, and functions as an interface between a user and the BLE stack. The application contains the logic, user interface, and data handling of everything related to the actual use for which the application has been implemented. The architecture of an application is thus dependent on each particular implementation.

The upper layers of the BLE stack comprise the host, while the lower layers comprise the controller. The host can include the following layers: Generic Access Profile (GAP), Generic Attribute Profile (GATT), Logical Link Control and Adaptation Protocol (L2CAP), Attribute Protocol (ATT), Security Manager (SM), and Host Controller Interface (HCI), Host side. The controller can include the following layers: Host Controller Interface (HCI), Controller side, Link Layer (LL), and Physical Layer (PHY).

While the BLE stack and specification are well known to those skilled in the art, a brief description of the GAP and GATT layers of the host are provided for purposes of the present description. GAP represents the framework that allows devices to discover each other, broadcast data, establish secure connections, and perform various other operations according to a universal BLE standard. GAP relates to radio protocols, procedures, and modes that allow BLE devices to broadcast, discover, and establish connections, as well as managing connections and security. GAP is essentially the top-most control layer of the BLE stack.

GATT represents the framework that establishes in detail how devices are to exchange profile and user data over a BLE connection. GATT does not define low-level interactions between devices, but rather relates to the actual data transfer procedures and formats in a standardized manner. GATT additionally provides a reference framework for GATT-based profiles, which cover specific use cases and facilitate interoperability between devices from different manufacturers. Standard BLE profiles are therefore based on GATT, and must comply with it to operate correctly. In order to facilitate operability, data should be formatted, packed and sent according to the GATT framework. GATT is thus a profile framework that relates to the characterization and exchange of data, and provides a model system for devices to discover, read, write, and transmit data back and forth. As such, GATT is essentially the top-most data layer of the BLE stack.

A Host Controller Interface (HCl) provides a standard communications protocol between the host and the controller. The three primary layers can be designed and implemented according to a variety of configurations. Some configurations implement all three primary layers on a single integrated circuit (IC), while others implement the primary layers across multiple ICs that are connected through a communication layer.

For example, one design can be referred to as a System on Chip (SOC). In such designs, a single IC can run the application, the host, and the controller. In another example, referred to as Dual IC over HCl, multiple ICs are utilized, where a first IC runs the application and the host and a second IC runs the controller. The Host and the controller communicate using the HCl. This design can allow a given host to be utilized with any controller, regardless of the manufacturer. Dual IC with Connectivity Device is another example of a design utilizing multiple ICs. In this case, a first IC runs the application and communicates with a second IC that is running the host and the controller. In this case, the communication protocol between the first IC and the second IC is generally proprietary, as this protocol is not included in the BLE specification.

BLE in general facilitates low-power wireless communication between BLE devices, thus allowing many BLE devices to be designed to operate using small batteries for extended periods of time, in some cases for a year or more. The low power consumption of BLE is typically at least partly due to a reduced duty cycle of the BLE protocol compared to classic Bluetooth. In this case, the BLE protocol stack allows the BLE device to sleep between processing events, thus reducing power consumption. Host-based processing of BLE data, however, can create a challenge to achieving and sustaining BLE power Key Performance Indicators (KPIs). One reason for this relates to the Operating System (OS) overhead of suspend/resume cycles and so-called "SW noise," where upon receiving a wake trigger or event of the OS for any reason, multiple applications have an opportunity to run. These running applications thus keep the platform in an awakened state for a longer period of time than is needed for processing just the original wake trigger or event alone. In one example, a significant impact on platform power can occur when wake events occur at rates higher than about 1 Hz. One result of a high frequency of wake events is increased battery drain, which subsequently can negatively impact battery life and User Experience (UX). It is noted that, even for wake event frequencies of less than 1 Hz, negative impacts on battery life can result in a less than desirable user experience.

Invention embodiments provide novel approaches for greatly reducing the power consumption of a BLE device. By rerouting data from the BLE Core to processing circuitry along a sideband channel, significant platform power savings can be achieved as a result of the decreased wake/sleep duty cycle of the host. In other words, such sideband processing allows the host to remain in a sleep state for longer periods of time, thus lowering the power consumption of the platform. As the BLE Core, sideband channel, and processing circuitry are functional when the platform is in a sleep or a low-power state, BLE data coming from remote devices can be rerouted and processed by the processing circuitry while the host sleeps. The host and the OS can then be notified and woken in response to an event of interest in order to generate or make a decision to generate a real-time alert or other notification to a user or application. It is noted that the processing circuitry and the sideband channel can include any configuration or implementation of circuitry and sideband communication that allows data to be processed during a sleep or otherwise idle state of the host.

In one exemplary implementation, an application, which can be an "offload-aware" application, discovers a remote BLE device, and establishes a BLE connection with that device using the OS BLE Application Program Interface (API). GATT Service Discovery can generally be done as a part of this process. Next, the application triggers the offloading and configures the BLE Core with an offload identifier used to identify the BLE GATT data that should be re-routed or offloaded to the sideband channel. The offload identifier is not limiting, and can include any identifier that the BLE Core can utilize to identify and offload or reroute BLE GATT data. Non-limiting examples can include BT/BLE Connection Handles, GATT Attribute Handles, Universally Unique Identifiers (UUID), peripheral device addresses, and the like, including combinations thereof.

Once configured, the BLE Core can begin monitoring any incoming BLE data and comparing that data with the offload identifier. When a match is found, the data can be rerouted to the sideband channel instead of being sent to the host over the Host Controller Interface (HCl). In some cases, only BLE GATT Data packets are rerouted to the sideband channel. It is additionally contemplated that in some examples all BLE GATT data is rerouted to the sideband channel, while in other examples only a portion of the BLE GATT data is rerouted.

BLE GATT data rerouted to the sideband channel is processed by processing circuitry distinct from the host, thus decreasing host power consumption. Processing can include any type of data computation, manipulation, transformation, or other use of the data that is capable of being performed apart from the host.

Non-limiting examples of processing of BLE GATT data can include buffering/aggregation, processing or preprocessing with various algorithms, fusion with additional sensors and/or contextual information, comparative analysis against additional sensors and/or contextual information, coincidence detection, the generation of real-time notifications to user, device, or application, including via local or cloud-based communication, and the like, including combinations thereof. In some examples, BLE GATT data acquired from a single remote device can be processed. In other examples, BLE GATT data acquired from multiple remote devices can be co-processed together. Additional information such as, for example, contextual information, can be utilized in the processing of the BLE GATT data.

The processing circuitry or components associated with the processing circuitry, monitors data processing for an event of interest that represents a cue to notify the host. If the host is in a sleep state, the notification can be utilized as a trigger, or as a stimulus to generate a trigger, to wake up the host. The host can be woken in response to a single event of interest, a threshold number of events of interest, a threshold frequency of events of interest, coincidence of one or more events of interest, and the like, including combinations thereof. For example, a trigger to awaken the host may be generated in response to the notification of a coincidence of a single first event of interest and a second event of interest, in response to the notification of a coincidence of a single first event of interest and a plurality of second events of interest generated at a frequency that is greater than a threshold frequency, or in response to any number of pattern recognition paradigms. It is noted that the term "event of interest" can also be applied to a given pattern recognition paradigm.

Upon receiving a sufficient trigger generated in response to an event of interest, the host can respond, for example, by generating an alert, notification, or performing some other action for a host-based application. A host in an awakened state can respond upon receiving the notification, while a host in a sleep state can wake upon receiving the notification and respond.

As one example, a cardiological application may be used to monitor a patient with possible heart-related medical issues. Heart-related data, such as pulse rate, pulse waveform, and the like, can be acquired by a remote heart monitor (e.g. Heart Rate Monitor (HRM) device), and delivered via wireless BLE to the host device. The BLE Core can be configured to identify heart-related BLE GATT data, which is rerouted to the sideband interface and processed by the processing circuitry. Upon detecting an event of interest, a notification is sent to the host to respond according to application instructions. One simple exemplary response may be alerting the application to send a message to a physician when the patient's heart rate exceeds a threshold rate.

In a slightly more complex example, heart-related BLE GATT data can be processed in conjunction with, or otherwise compared to, contextual information or other relevant data. Non-limiting examples can include patient activity, time of day, medication dosage and/or medication timing, and the like, including combinations thereof. As such, the heart-related data can be evaluated in context with various physiological and non-physiological factors. For example, a patient lying in bed at night with an elevated heart rate is generally of greater concern than an elevated heart rate during the day while exercising. A decision algorithm that incorporates such contextual information can more accurately identify events of interest in real time, and can identify more complex events of interest or combinations of events of interest. Such enhanced decision making at the processing circuitry can provide more meaningful and accurate event alert notification, thus further increasing the sleep time of the host.

As an example, an apparatus of a BLE device can decrease the awake time of the host by receiving and processing peripheral data along a sideband channel, and waking the host upon an event of interest. In one example, as is shown in FIG. 1, the apparatus can include circuitry configured to 102 receive BLE GATT data from a BLE core along a sideband channel, 104 process the BLE GATT data, 106 monitor processed BLE GATT data for an event of interest, and 108 send a notification of a detection of the event of interest to the host. Thus, by splitting the BLE GATT Control and Data planes of a specific BLE connection and re-routing the BLE GATT Data traffic from the BLE Core to processing circuitry along a sideband channel, significant platform power savings can be achieved.

Figure 2:
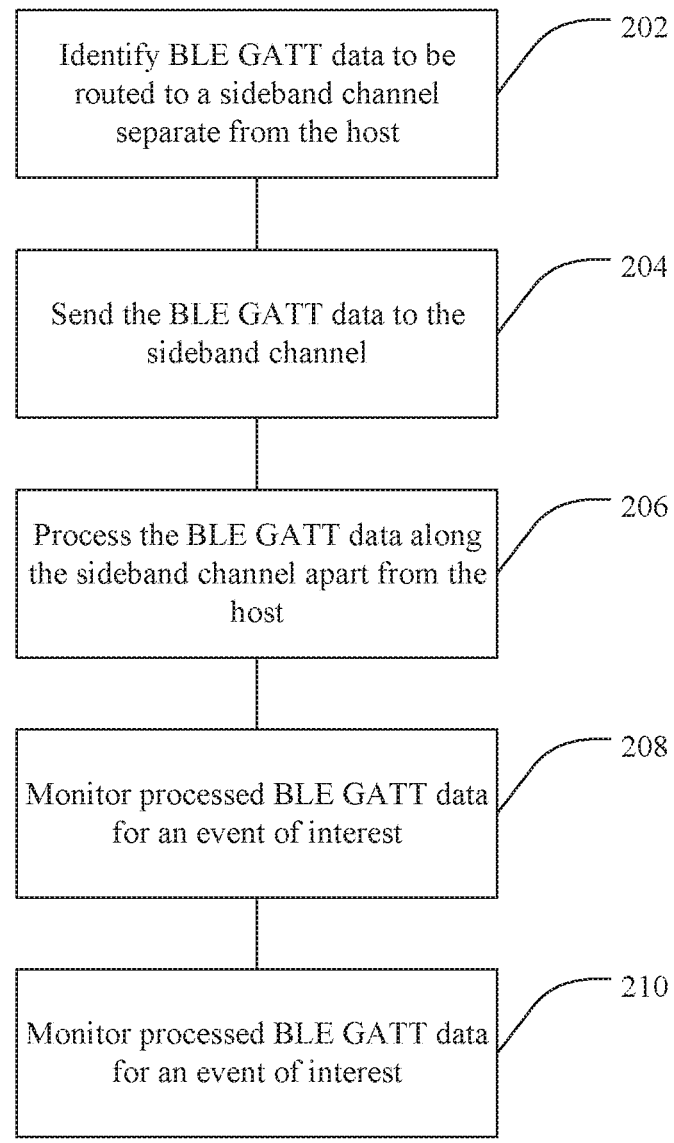
FIG. 2 is a depiction of circuitry operations of an apparatus of a BLE device in accordance with an invention embodiment.

As another example, as is shown in FIG. 2, an apparatus of a BLE device for decreasing energy usage by increasing host sleep time is provided. The apparatus can include circuitry configured to 202 identify BLE GATT data to be routed to a sideband channel separate from the host, 204 send the BLE GATT data to the sideband channel, 206 process the BLE GATT data along the sideband channel apart from the host, 208 monitor processed BLE GATT data for an event of interest, and 210 send a notification of a detection of the event of interest to the host.

Figure 3:
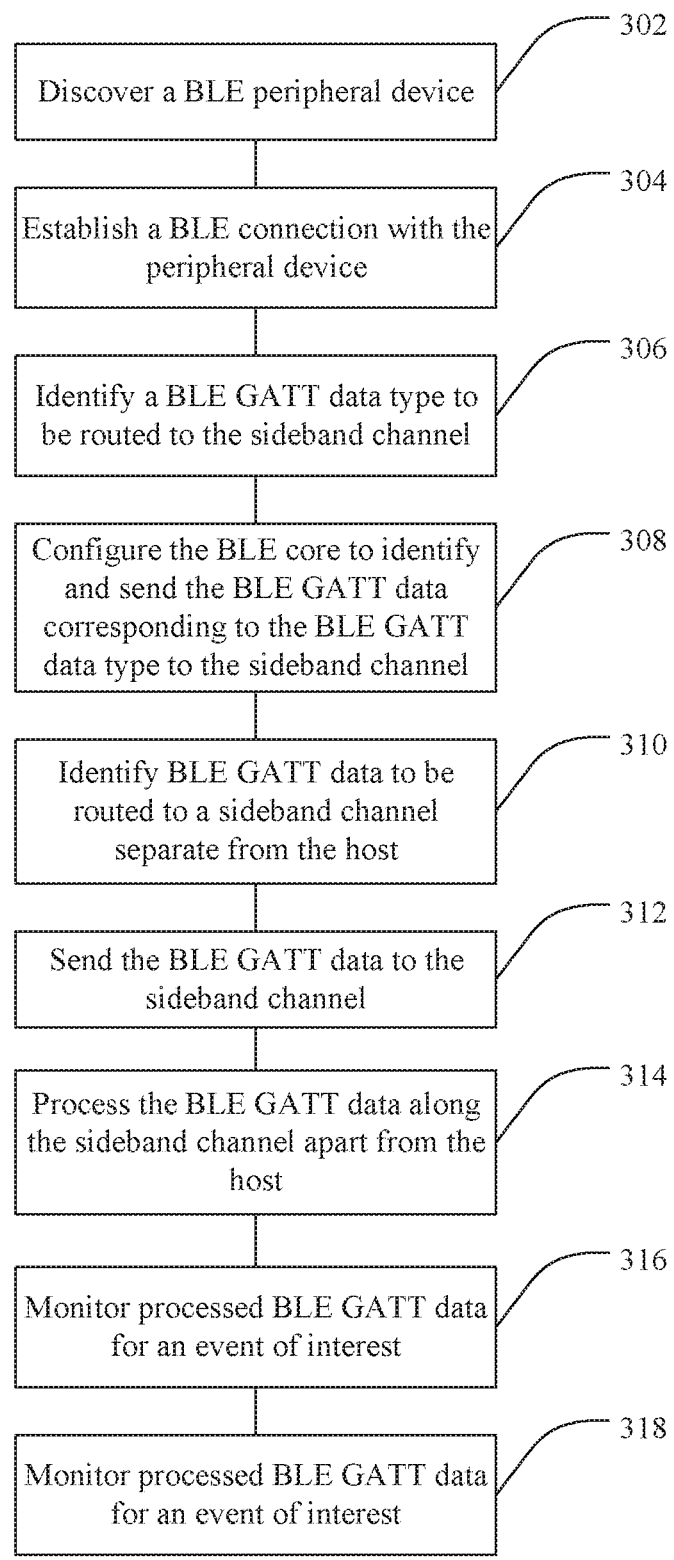
FIG. 3 is a depiction of circuitry operations of an apparatus of a BLE device in accordance with an invention embodiment.

FIG. 3 shows yet another example of an apparatus of a BLE device for decreasing energy usage by increasing host sleep time. The apparatus can include circuitry configured to 302 discover a BLE peripheral device and 304 establish a BLE connection with the peripheral device. The circuitry can further be configured to 306 identify a BLE GATT data type or data category to be routed to the sideband channel and 308 configure the BLE Core to identify and send BLE GATT data corresponding to the BLE GATT data type to the sideband channel. The configuration of the BLE Core can occur prior to connection with the peripheral device or following the connection to the peripheral device. Additionally, the circuitry can be configured to 310 identify BLE GATT data to be routed to a sideband channel separate from the host, 312 send the BLE GATT data to the sideband channel, 314 process the BLE GATT data along the sideband channel apart from the host, 316 monitor processed BLE GATT data for an event of interest, and 318 send a notification of a detection of the event of interest to the host.

BLE GATT data can be identified using any data identifier capable of facilitating the rerouting of GATT data to the sideband channel. By utilizing data identifiers existing in the BLE GATT specification, conflicts with the BLE stack can be minimized, thus facilitating integration with existing BLE technologies. Non-limiting examples of data identifiers or BLE data parameters include connection handles, GATT attribute handles, Universally Unique Identifiers (UUID), peripheral device addresses, and the like, including combinations thereof. Additionally, in one example the GATT data can be unacknowledged notification data. In another example, the GATT data can be acknowledged indication data.

Figure 4:
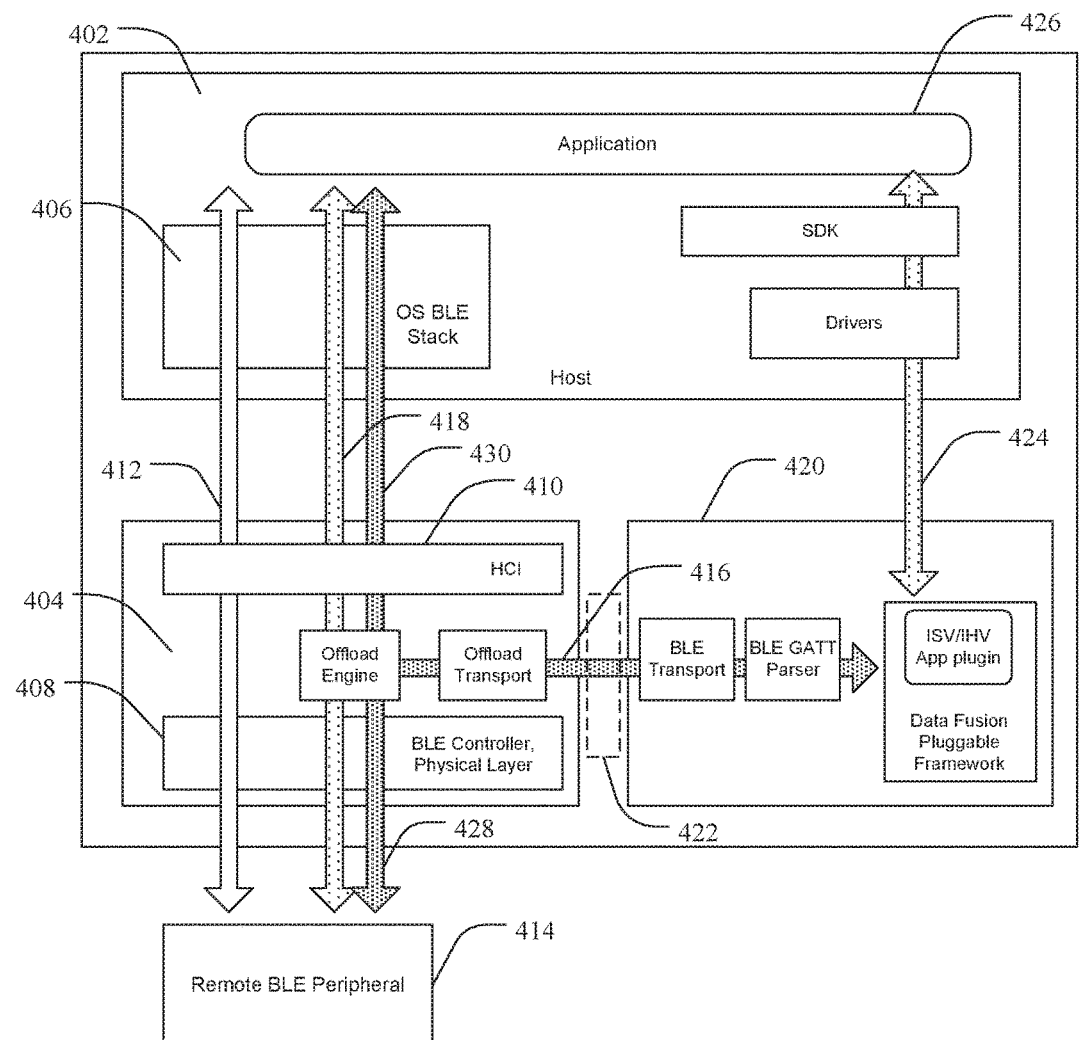
FIG. 4 is a schematic view of a BLE apparatus in accordance with an invention embodiment.

FIG. 4 shows an example of one implementation of a BLE apparatus having decreased energy use. This BLE design includes a host 402 in communication with a controller 404. As has been described, the upper layers 406 of the BLE stack reside at the host 402, while the lower layers 408 of the BLE stack reside at the controller 404. The upper layers 406 and the lower layers 408 communicate via the HCI 410, shown in FIG. 4 associated with the controller 404; however, there can be a host-side HCI (not shown) at the host 402. In traditional BLE devices, control and data planes 412 (i.e. "traditional" data plane or data flow) to and from a remote peripheral 414 flow through the controller 404 and the HCI 410 to the upper layers of the BLE stack 406 at the host 402. In invention embodiments, the data plane 416 is split from the control plane 418 at the level of the controller 404, although it is contemplated that the control and data planes can be divided or tagged to be divided at the remote BLE peripheral. In one example, however, the BLE controller can be configured to identify the data plane, or specific data or a specific data type of the data plane. Once identified, the lower layers 408 of the controller 404 offload the data plane 416 to the processing circuitry 420 along a sideband channel 422. The control plane 418 is directed through the controller 404 and the HCI 410 to the upper layers 406 of the BLE stack at the host 402.

The degree to which the data plane is split and rerouted to the sideband channel 422 can vary depending on a variety of factors, including the type of data, the potential frequency of relevant events of interest, the intended use of the data, and the like. In one example, all of the data from the remote peripheral 414 is rerouted to the sideband channel 422. In another example, only a portion of the data is rerouted to the sideband channel. As is shown in FIG. 4, for example, the entire data plane 428 from the remote peripheral 414 can be split into at least two data flows: the data plane 416 or portion of data that is rerouted to the processing circuitry 420, and a traditional data plane 430 or portion of the data that is routed along the traditional BLE data flow path through the controller 404 and the HCI 410 to the upper layers of the BLE stack 406 at the host 402. In various exemplary implementations, therefore, the data plane 416 can be the entire data plane 428 coming from a single or multiple remote devices, or only a portion of the entire data plane 428 coming from a single or multiple remote devices. In one example, all data of a specific type or category of GATT data coming from a remote device can be rerouted. So for heart rate, for example, all data identified as BLE GATT heart rate data is rerouted to the sideband channel 422, while the remaining data follows the traditional flow to the host. In another example, data from a specific type or category of GATT data coming from a remote device is sampled, and only the sampled portion of the data is sent to the sideband channel. So as one heart rate example, heart rate data arriving at the controller is sampled for a duration of 10 seconds every minute, and the 10 second samples are sent to the sideband channel while the remaining 50 seconds of data follow the traditional route. In addition to periodic sampling, event-based sampling is also contemplated. For example, one cardiac waveform can be sent to the sideband channel every 10 seconds. The actual portion of data sent to the sideband channel can vary depending on various factors relating to the type of data being captured and the intended data usage.

The processing circuitry 420 receives and processes BLE GATT data from the data plane 416, as has been described herein. The processing circuitry 420 can communicate directly with the host, as is shown at 424, or via the controller 404. Processing circuitry can include various combinations of hardware, firmware, program code, executable code, computer instructions, and/or software. In one example, the processing circuitry can include a processor or coprocessor. In another example, the processing circuitry can be implemented in a chipset. In yet another example, the processing circuitry can include a microprocessor. In a further example, the processing circuitry can include a digital signal processor. In yet another example, the processing circuitry can include an Integrated Sensory Hub (ISH). An ISH is a processing module or processing unit that can integrate data from different sensors, and process the data, either individually or following integration. An ISH can be implemented using various designs, all of which are considered to be within the present scope. In one example, an ISH can be a discrete component, such as a processor, coprocessor, microprocessor, digital signal processor, and the like. In another example, the ISH can be implemented in a chipset.

The sideband channel 422 can be any form of communication channel that is functional when a host is in a sleep or low power state. The present scope includes any such communication technology useable as a sideband channel, as are known in the art. One example includes a universal asynchronous receiver/transmitter (UART). A UART can be a single UART or any multiple thereof. Additionally, in some examples a synchronous UART can be utilized in the sideband channel.

The user application 426 can be offload-aware, and thus be able to trigger offloading for identified BLE connections. Additionally, the application can be designed to be listening or ready to receive an asynchronous alert/notification from the processing circuitry to generate an appropriate response.

Numerous applications of BLE-connected devices are contemplated that can benefit from lower power consumption and reduced host processing. In the area of wearables for health and fitness applications, for example, devices can be characterized by various event rates, data types, size, etc. One non-limiting example is a life logger, a fusion of Heart-Rate Monitor (HRM) data with activity status and time information to identify physiological conditions indicating a potential heart attack. Upon notification, a trigger can be generated to the user, a physician, hospital, etc. Life logger is an example of rate events (e.g. <1 Hz). Another example is a high accuracy Pedestrian Dead Reckoning (PDR) sensor system, which is a fusion of inputs from multiple accelerometers located both locally (e.g. on a mobile device, such as a phone or tablet) and on remote devices (e.g. smartwatch, clip-on sensor). Such an activity monitoring device may include mid-rate events (e.g. 50-100 Hz). Yet another example includes systems for sorting related activities, such as for the fusion of data from multiple sensors with movement/activity information (e.g. data from multiple pressure sensors in running smart insoles and activity context). These types of sensory systems are examples of high-rate events (e.g. >100 Hz). However, nearly any device, including sensor devices, or systems which utilize BLE can benefit from the present technology.

In another example, there is provided a non-transitory machine readable storage medium having instructions embodied thereon for decreasing awake time of a host in a BLE device, the instructions when executed can perform the following: identifying, using a BLE core, BLE GATT data to be routed to a sideband channel separate from the host, sending, using the BLE core, the BLE GATT data to the sideband channel, processing, using a processor in the sideband channel, the BLE GATT data, monitoring, using the processor in the sideband channel, the processed BLE GATT data for an event of interest, and sending, using the processor, a notification of a detection of the event of interest to the host. Furthermore, in another example the instructions can further perform the following when executed: discovering, using BLE Application Program Interface (API) of the BLE core, a BLE peripheral device, and establishing, using the BLE API, a BLE connection with the peripheral device. Further instructions can include identifying a BLE GATT data type or data identifier to be routed to the sideband channel, configuring the BLE core to identify the BLE GATT data corresponding to the BLE GATT data type, and sending, using the BLE core, the BLE GATT data to the sideband channel.

In another example, a non-transitory machine readable storage medium is provided having instructions embodied thereon for decreasing awake time of a host in a BLE device, the instructions when executed can perform the following: identifying, using a BLE core, BLE GATT data to be routed to a sideband channel separate from the host, sending, using the BLE core, the BLE GATT data to the sideband channel, processing, using circuitry in the sideband channel, the BLE GATT data, monitoring, using circuitry in the sideband channel, the processed BLE GATT data for an event of interest, and sending, using circuitry in the sideband channel, a notification of a detection of the event of interest to the host.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. A node and wireless device can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that the methodology corresponding to the function and elements of the devices and systems recited herein will be readily apparent to one of ordinary skill in the art upon a review of the present disclosure. For example, a method of decreasing awake time of a host or otherwise reducing power consumption by a host can include, receiving BLE GATT data from a BLE core along a sideband channel; processing the BLE GATT data; monitoring the processed BLE GATT data for an event of interest; and sending a notification of a detection of an event of interest to a host.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be integrated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

EXAMPLES

In one example, an apparatus of a Bluetooth low energy (BLE) device is provided for decreasing awake time of a host by receiving and processing peripheral data along a sideband channel and waking the host upon an event of interest, the apparatus comprising circuitry configured to:
receive BLE GATT data from a BLE core along a sideband channel;
process the BLE GATT data;
monitor processed BLE GATT data for an event of interest; and
send a notification of a detection of the event of interest to the host.

In another example, processing the BLE GATT data further comprises integrating BLE GATT data from multiple peripheral devices.

In another example, processing the BLE GATT data further comprises incorporating contextual information into the BLE GATT data.

In another example, the circuitry includes an integrated sensor hub.

In another example, sending the notification of the detection of the event of interest further includes waking the host from a sleep state.

In another example, an apparatus of a BLE device is provided for decreasing energy usage by increasing host sleep time, the apparatus comprising circuitry configured to:
identify BLE GATT data to be routed to a sideband channel separate from the host;
send the BLE GATT data to the sideband channel;
process the BLE GATT data along the sideband channel apart from the host;
monitor processed BLE GATT data for an event of interest; and
send a notification of a detection of the event of interest to the host.

In another example, the circuitry is further configured to:
discover a BLE peripheral device; and
establish a BLE connection with the peripheral device.

In another example, the circuitry is further configured to:
identify a BLE GATT data type to be routed to the sideband channel; and
configure a BLE core to identify and send the BLE GATT data corresponding to the BLE GATT data type to the sideband channel.

In another example, the BLE GATT data is identified using an existing BLE data parameter.

In another example, the existing BLE data parameter includes a parameter selected from the group consisting of a connection handle, a GATT attribute handle, a Universally Unique Identifier (UUID), a peripheral device address, and combinations thereof.

In another example, the BLE GATT data is identified using existing GATT notification.

In another example, the circuitry is further configured to wake the host upon detection of the event of interest.

In another example, processing the BLE GATT data further comprises integrating BLE GATT data from multiple peripheral devices.

In another example, processing the BLE GATT data further comprises incorporating contextual information into the BLE GATT data.

In another example, the circuitry includes an integrated sensor hub.

In another example, the BLE GATT data is unacknowledged BLE GATT data.

In another example, the BLE GATT data is acknowledged BLE GATT data.

In another example, the routing of the BLE GATT data to the sideband channel integrates with existing BLE core specification.

In another example, a non-transitory machine readable storage medium is provided having instructions embodied thereon for decreasing awake time of a host in a BLE device, the instructions when executed perform the following:

identifying, using a BLE core, BLE GATT data to be routed to a sideband channel separate from the host;

sending, using the BLE core, the BLE GATT data to the sideband channel;

processing, using a processor in the sideband channel, the BLE GATT data;

monitoring, using the processor in the sideband channel, the processed BLE GATT data for an event of interest; and sending, using the processor, a notification of a detection of the event of interest to the host.

In another example, the instructions perform the following when executed:

discovering, using BLE Application Program Interface (API) of the BLE core, a BLE peripheral device; and establishing, using the BLE API, a BLE connection with the peripheral device.

In another example, the instructions perform the following when executed:

identifying a BLE GATT data type to be routed to the sideband channel;

configuring the BLE core to identify the BLE GATT data corresponding to the BLE GATT data type; and sending, using the BLE core, the BLE GATT data to the sideband channel.

In another example, processing the BLE GATT data further comprises integrating BLE GATT data from multiple peripheral devices.

In another example, processing the BLE GATT data further comprises incorporating contextual information into the BLE GATT data.

In another example, sending the notification of the detection of the event of interest further includes waking the host from a sleep state.

In another example, a non-transitory machine readable storage medium is provided having instructions embodied thereon for decreasing awake time of a host in a BLE device, the instructions when executed perform the following:

identifying, using a BLE core, BLE GATT data to be routed to a sideband channel separate from the host;

sending, using the BLE core, the BLE GATT data to the sideband channel;

processing, using circuitry in the sideband channel, the BLE GATT data;

monitoring, using circuitry in the sideband channel, the processed BLE GATT data for an event of interest; and sending, using circuitry in the sideband channel, a notification of a detection of the event of interest to the host.

In another example, processing the BLE GATT data further comprises integrating BLE GATT data from multiple peripheral devices.

In another example, processing the BLE GATT data further comprises incorporating contextual information into the BLE GATT data.

In another example, the instructions perform the following when executed:

discovering, using BLE Application Program Interface (API) of the BLE core, a BLE peripheral device; and establishing, using the BLE API, a BLE connection with the peripheral device.

In another example, the instructions perform the following when executed:

identifying a BLE GATT data type to be routed to the sideband channel;

configuring the BLE core to identify the BLE GATT data corresponding to the BLE GATT data type; and sending, using the BLE core, the BLE GATT data to the sideband channel.

In another example, sending the notification of the detection of the event of interest further includes waking the host from a sleep state.

While the forgoing examples are illustrative of the specific embodiments in one or more particular applications, it will be apparent to those of ordinary skill in the art that numerous modifications in form, usage and details of implementation can be made without departing from the principles and concepts articulated herein. Accordingly, no limitation is intended except as by the claims set forth below.

What is claimed is:

1. An apparatus of a Bluetooth low energy (BLE) device for decreasing awake time of a host by receiving and processing peripheral data along a communication channel and waking the host upon an event of interest, the apparatus comprising circuitry configured to:

receive BLE Generic Attribute Profile (GATT) data from a BLE core;

identify a BLE GATT data type associated with the BLE GATT data;

reroute the BLE GATT data to a communication channel based on the BLE GATT data type, wherein the BLE GATT data is rerouted to the communication channel while bypassing the host, and the communication channel is functional when the host is in a sleep or low power state;

process the BLE GATT data using a processor in the communication channel;

monitor processed BLE GATT data for an event of interest; and send a notification of a detection of the event of interest to the host.

2. The apparatus of claim 1, wherein processing the BLE GATT data further comprises integrating BLE GATT data from multiple peripheral devices.

3. The apparatus of claim 1, wherein processing the BLE GATT data further comprises incorporating contextual information into the BLE GATT data.

4. The apparatus of claim 1, wherein the circuitry includes an integrated sensor hub.

5. The apparatus of claim 1, wherein sending the notification of the detection of the event of interest further includes waking the host from a sleep state.

6. An apparatus of a Bluetooth low energy (BLE) device for decreasing energy usage by increasing host sleep time, the apparatus comprising circuitry configured to:
discover a BLE peripheral device;
establish a BLE connection with the peripheral device;
identify BLE data received from the peripheral device over the BLE connection to be routed to a communication channel separate from the host;
send the BLE data to the communication channel;
process the BLE data along the communication channel apart from the host;
monitor processed BLE data for an event of interest; and
send a notification of a detection of the event of interest to the host.

7. The apparatus of claim 6, wherein the circuitry is further configured to:
identify a BLE data type to be routed to the communication channel; and
configure a BLE core to identify and send the BLE data corresponding to the BLE data type to the communication channel.

8. The apparatus of claim 7, wherein the BLE data is identified using an existing BLE data parameter.

9. The apparatus of claim 8, wherein the existing BLE data parameter includes a parameter selected from the group consisting of a connection handle, an attribute handle, a Universally Unique Identifier (UUID), a peripheral device address, and combinations thereof.

10. The apparatus of claim 7, wherein the BLE data is identified using existing notification.

11. The apparatus of claim 6, wherein the circuitry is further configured to wake the host upon detection of the event of interest.

12. The apparatus of claim 6, wherein processing the BLE data further comprises integrating BLE data from multiple peripheral devices.

13. The apparatus of claim 6, wherein processing the BLE data further comprises incorporating contextual information into the BLE data.

14. The apparatus of claim 6, wherein the circuitry includes an integrated sensor hub.

15. The apparatus of claim 6, wherein the routing of the BLE data to the communication channel integrates with existing BLE core specification.

16. The apparatus of claim 6, wherein the BLE data includes BLE Generic Attribute Profile (GATT) data.

17. The apparatus of claim 6, wherein the communication channel separate from the host is functional when the host is in a sleep or low power state.

18. A non-transitory machine readable storage medium having instructions embodied thereon for decreasing awake time of a host in a BLE device, the instructions when executed performing the following:
identifying, using a BLE core, BLE data to be routed to a communication channel separate from the host;
sending, using the BLE core, the BLE data to the communication channel;
processing, using a processor in the communication channel, the BLE data, wherein the BLE data incorporates contextual information;
monitoring, using the processor in the communication channel, the processed BLE data for an event of interest; and
sending, using the processor, a notification of a detection of the event of interest to the host to wake the host from a sleep state.

19. The non-transitory machine readable storage medium of claim 18, further comprising instructions that perform the following when executed:
discovering, using a BLE Application Program Interface (API) of the BLE core, a BLE peripheral device; and
establishing, using the BLE API, a BLE connection with the peripheral device.

20. The non-transitory machine readable storage medium of claim 18, further comprising instructions that perform the following when executed:
identifying a BLE data type to be routed to the communication channel;
configuring the BLE core to identify the BLE data corresponding to the BLE data type; and
sending, using the BLE core, the BLE data to the communication channel.

21. The non-transitory machine readable storage medium of claim 18, wherein processing the BLE data further comprises integrating BLE data from multiple peripheral devices.

22. The non-transitory machine readable storage medium of claim 18, wherein the BLE data includes BLE Generic Attribute Profile (GATT) data.

* * * * *